June 19, 1951 M. BOEHM 2,557,720
MOTION ARRESTING DEVICE
Filed Sept. 8, 1949
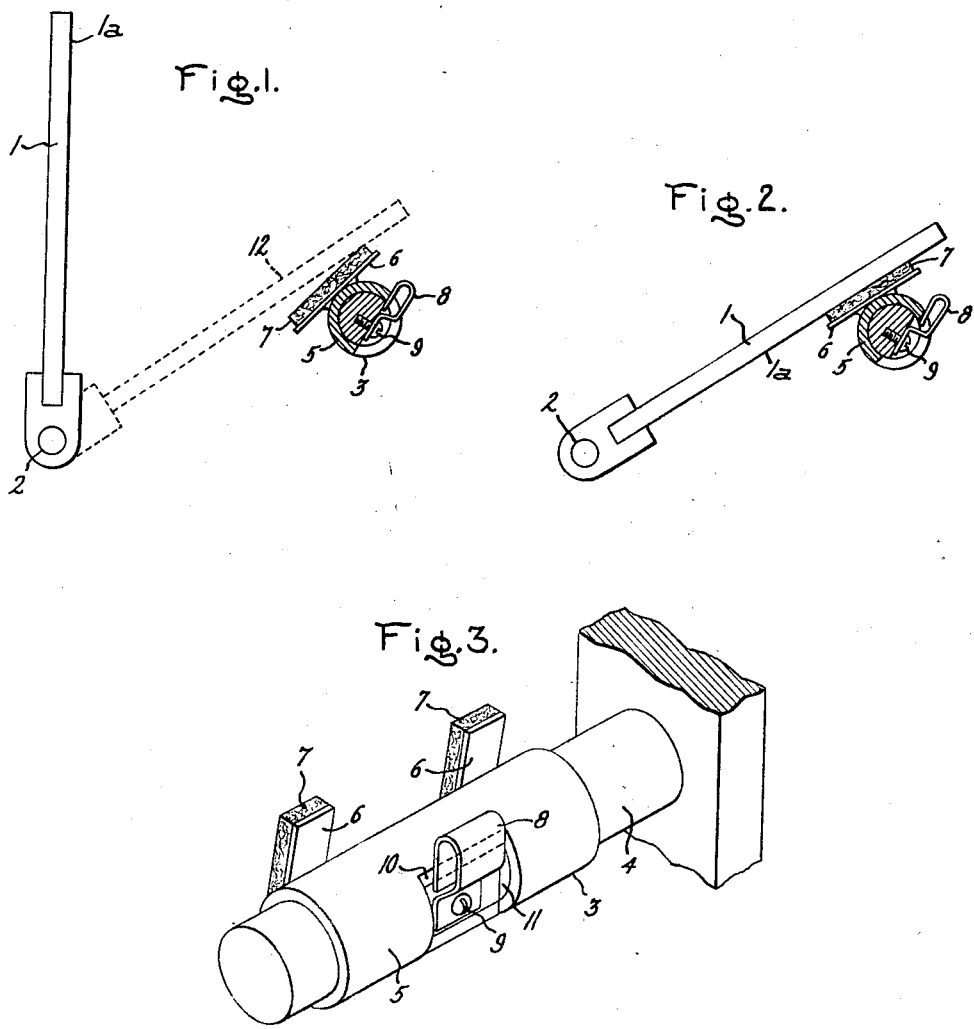
Inventor:
Michael Boehm,
by Paul A. Frank
His Attorney.

Patented June 19, 1951

2,557,720

UNITED STATES PATENT OFFICE 2,557,720

MOTION ARRESTING DEVICE

Michael Boehm, Schenectady, N. Y., assignor to General Electric Company, a corporation of New York Application September 8, 1949, Serial No. 114,516

3 Claims. (Cl. 74—526)

My invention relates to motion arresting devices and more particularly to devices for bringing a rotating member to a dead stop without oscillation or rebound.

An object of my invention is the provision of an improved motion arresting and oscillation damping device of this character.

Another object of my invention is to provide a motion arresting device which brings a determinably moving member to a dead stop without the use of a snap lock or other retaining means which may require unlocking before the moving member may be reset for repeated excursions.

A more specific object is to provide a motion arresting and oscillation damping device peculiarly well-suited for use in an optical type oscillograph which employs a moving mirror to obtain a time base sweep. The motion arresting device may be arranged in an oscillograph of this optical type to bring the mirror to a dead stop at the end of its range of travel so that no spurious traces are produced at the end of its sweep.

In general, my improved motion arresting and oscillation damping device comprises a cylindrical supporting member located in the path of rotation of a rotatable member with its axis parallel to the pivot axis of the rotatable member. A damping platform, whose damping surface is constructed to conform to the striking surface of the rotatable member is carried by a collar which is journaled on the supporting member. The damping platform is biased by a tension producing element connected between the collar and the supporting member to assume a position inclined at a predetermined angle from an initial striking plane of the rotatable member. As the rotatable member is rotated beyond this initial striking plane, the damping platform and the collar are correspondingly rotated on the supporting member, and the tension of the tension producing element is increased and thereby tends to counteract the rotational force of the striking member. By the time the damping platform reaches a position parallel to the rotatable member, substantially the entire rotational force is absorbed by the tension element, and due to the conforming adjacent surfaces of the rotatable member and the damping platform, the rotatable member comes to a complete arrested position on the platform without further oscillation or rebound.

The novel features which I believe to be characteristic of my invention are set forth with particularity in the appended claims. My invention itself, however, together with further objects and advantages thereof can best be understood by reference to the following description taken in connection with the accompanying drawing in which Fig. 1 is a cross-sectional view of a rotatable member and a motion arresting device embodying my invention and illustrating the relative positions of the rotatable member and the motion arresting device when the rotatable member reaches its initial striking plane, Fig. 2 is a cross-sectional view similar to Fig. 1 illustrating the relative positions of the rotatable member and the motion arresting device when the rotatable member is in its final arrested position, and Fig. 3 is a perspective view of the motion arresting device included in Figs. 1 and 2.

Referring to Fig. 1, I have shown my invention in one form as employed in conjunction with a rotatable member or plate 1, such as the mirror of an optical type oscillograph, which is pivoted on a hinge 2 and which preferably has a flat striking surface 1a. A motion arresting device 3 is located in the path of rotation of the rotatable member 1 as illustrated in Fig. 1. The motion arresting device itself, as best seen in Fig. 3, comprises a cylindrical supporting member 4 which serves as a swivel stud. A collar 5 is journaled on the supporting member 4 and carries at least one, but preferably two, damping platforms 6, as shown. Each platform 6 has a flat surface configuration which conforms to the striking surface of the rotatable member and is preferably covered by a pad 7 of suitable resilient shock absorbing material, such as felt or rubber.

A tension producing element is connected between the collar 5 and the supporting member 4 in order to bias the damping paltforms 6 at a predetermined angular position with respect to an initial striking plane of the rotatable member 1. This tension element preferably comprises a resilient metallic flange 8 secured at one end to the supporting member 4 by such means as a screw 9 and pressing at its other end against a rim 10 of an aperture 11 formed in the body of the collar 5. It is evident that many other biasing arrangements, using other forms of tension elements, will occur to those skilled in the art and may alternatively be provided.

In the operation of my invention, the platform 6 of the motion arresting device 3 is biased by the tension of the tension element 9 to assume a position inclined at a predetermined angle to an initial striking plane of the rotatable member 1 diagrammatically designated by the dashed lines 12 of Fig. 1. As the rotatable member continues to travel beyond its initial striking plane, the damping platform and the collar attached thereto are rotated on the supporting member 4 until the damping platform reaches a position parallel to the rotatable member, as illustrated in Fig. 2. The tension on the tension element 9 is correspondingly increased and tends to counteract the rotation force of the rotating member. It has been found that by adjusting the angle at which the damping platform is biased with respect to the initial striking plane of the rotating member and by adjusting the tensional force of the tension element 8, the increased tension caused by the rotation of the collar 5 on the supporting member 4 can be made to completely counteract the rotational force of the rotating member 1. In addition, the contact of the entire surface of each damping platform 6 with the conforming striking surface 1a of the rotating member 1 when the rotating member reaches a position parallel to the damping platform prevents a further rotational movement of the rotating member in either direction with the result that the rotatable member comes to a final resting position on the damping platform without oscillation or rebound.

It will also be appreciated that a motion arresting device is thus produced which does not employ a snap lock or other retaining means so that the rotatable member may be immediately reset for repeated motion by any suitable mechanical or manual means without the necessity of additional unlocking or releasing mechanism.

It is to be understood that while I have shown a particular embodiment of my invention, many modifications can be made, and I, therefore, intend by the appended claims to cover all such modifications as fall within the true spirit and scope of my invention.

What I claim as new and desire to secure by Letters Patent of the United States is:

1. In combination, a rotatable member, a cylindrical supporting member located in the path of rotation of said rotatable member with its axis parallel to the pivot axis of said rotatable member, a collar journaled on said supporting member, at least one damping platform mounted on said collar, said platform having a surface configuration conforming to the striking surface of said rotatable member, and a tension element connected to exert a tension between said collar and said supporting member for biasing said platform in a predetermined angular position with respect to an initial striking plane of said rotatable member, and said tension element exerting a tension against said collar substantially equal to the striking force of said rotatable member whereby said rotatable member is brought to a dead stop by an increasing tension of said tension element as said rotatable member effects a rotation of said platform and said collar relative to said supporting member and by said conforming surface of said platform.

2. A motion arresting device comprising, a cylindrical supporting member, a cylindrical collar journaled on said supporting member, said collar having an aperture formed in the body thereof, a damping platform mounted on said collar, and a resilient member fastened to said supporting member within said aperture and arranged to exert a tension against said collar at the rim of said aperture to bias said platform at a predetermined angular position with respect to said supporting member.

3. In an oscillograph having an optical system including a rotatable substantially flat mirror, a motion arresting and oscillation damping device for bringing said mirror to a dead stop comprising, a cylindrical swivel stud located in the path of rotation of said mirror with its axis parallel to the pivot axis of said mirror, a cylindrical collar journaled on said swivel stud, said collar having an aperture formed in the body thereof, at least two similar substantially flat damping platforms secured at longitudinally spaced points on said collar so that said platforms lie within the same plane and coextend from the surface of said collar, and a tension producing element fastened to said swivel stud within said aperture and arranged to exert a tension against said collar at the rim of said aperture to bias said platform at a predetermined angular position with respect to an initial striking plane of said mirror and to absorb the rotational force of said mirror by an increasing tension of said tension element as said mirror continues to rotate toward a final arrested position on said platforms and by the conformance of the flat surface of said damping platforms with the flat striking surface of said mirror.

MICHAEL BOEHM.

REFERENCES CITED

The following references are of record in the file of this patent:

UNITED STATES PATENTS

| Number | Name | Date |
|---|---|---|
| 2,420,527 | Dyson | May 13, 1947 |